US007802071B2

(12) United States Patent
Oved

(10) Patent No.: US 7,802,071 B2
(45) Date of Patent: Sep. 21, 2010

(54) DEVICE, SYSTEM, AND METHOD OF PUBLISHING INFORMATION TO MULTIPLE SUBSCRIBERS

(75) Inventor: Tzah Oved, Ramat Gan (IL)

(73) Assignee: Voltaire Ltd., Raanana (IL)

( * ) Notice: Subject to any disclaimer, the term of this patent is extended or adjusted under 35 U.S.C. 154(b) by 431 days.

(21) Appl. No.: 11/778,109

(22) Filed: Jul. 16, 2007

(65) Prior Publication Data

US 2009/0024817 A1 Jan. 22, 2009

(51) Int. Cl.
*G06F 12/00* (2006.01)
(52) U.S. Cl. ..................................... 711/170
(58) Field of Classification Search ........................ None
See application file for complete search history.

(56) References Cited

U.S. PATENT DOCUMENTS

2003/0145230 A1* 7/2003 Chiu et al. .................. 713/201
2004/0037319 A1 2/2004 Pandya
2004/0225719 A1* 11/2004 Kisley et al. ................ 709/212
2006/0168331 A1 7/2006 Thompson et al.
2006/0200584 A1* 9/2006 Bhat ........................... 709/249
2006/0294045 A1 12/2006 Suggs et al.
2007/0233585 A1* 10/2007 Ben Simon et al. ........... 705/35
2008/0282337 A1* 11/2008 Crawford ..................... 726/12

OTHER PUBLICATIONS

International Search Report for PCT/IL2008/000983 dated Nov. 19, 2008.
Jim Pinkerton, "The Case for RDMA", RDMA Consortium, May 29, 2002, pp. 1-27.

* cited by examiner

*Primary Examiner*—Hiep T Nguyen
(74) *Attorney, Agent, or Firm*—Eitan Mehulal Law Group

(57) ABSTRACT

Device, system, and method of publishing information to multiple subscribers. For example, a data publisher capable of communication with one or more subscribers includes: a memory allocator to allocate a memory area of a local memory unit of the data publisher for storing data to be accessible for Remote Direct Memory Access (RDMA) read operations by one or more of said subscribers.

23 Claims, 4 Drawing Sheets

DEVICE, SYSTEM, AND METHOD OF PUBLISHING INFORMATION TO MULTIPLE SUBSCRIBERS

FIELD

Some embodiments of the invention are related to the field of communication, and more particularly to publication of information to multiple subscribers.

BACKGROUND

In some communication system, a data publisher (e.g., a server) may deliver data to thousands of subscribers (e.g., clients). Data delivery may be performed, for example, using multicast data transport.

Unfortunately, multicast data transport may have disadvantages. For example, it may require significant overhead at the publisher side; it may deliver to a particular subscriber data that the particular subscriber does not need; it may require re-transmit mechanisms to improve reliability of data delivery, which in turn may result in a "multicast storm" and further loss of subsequent data; it may suffer from latency; it may result a dependency of the subscribers on the publisher for active delivery (ergs, "push") of data by the publisher to the subscribers; and it may require a synchronization scheme, a timing scheme or other coupling scheme between the publisher and the subscribers.

SUMMARY

Some embodiments of the invention include, for example, devices, systems, and methods of publishing information to one or more local or remote subscribers.

Some embodiments include, for example, a data publisher capable of communication with one or more subscribers, the data publisher including a memory allocator to allocate a memory area of a local memory unit of the data publisher for storing data to be accessible for Remote Direct Memory Access (RDMA) read operations by one or more of the subscribers.

In some embodiments, the memory area includes one or more message stores able to store a plurality of messages corresponding to the data.

In some embodiments, the memory area is registered towards an RDMA-capable hardware component for RDMA read operations.

In some embodiments, a message store includes a cyclic buffer; the data publisher is to locally write messages to the cyclic buffer; and the one or more subscribers are to read messages from said cyclic buffer.

In some embodiments, the one or more subscribers are to remotely pull on demand at least some of the messages from at least one of the message stores.

In some embodiments, a first subscriber is authorized by the data publisher to pull data from a first message store and is not authorized by the data publisher to pull data from a second message store.

In some embodiments, at least one of the subscribers is to perform a Remote Direct Memory Access (RDMA) read operation on the memory area to pull at least some of the messages.

In some embodiments, at least one of the subscribers is to read from the memory area by bypassing an Operating System (OS) of the data publisher.

In some embodiments, a first subscriber is to remotely pull messages from the memory area at a first pace, and a second subscriber is to remotely pull messages from the memory area at a second, different, pace.

In some embodiments, the one or, more subscribers are decoupled from the data publisher, and the one or more subscribers are to remotely pull data from the memory area independent of a timing scheme common to the data publisher and the one or more subscribers.

In some embodiments, at least one of the subscribers is to perform the RDMA read operation through InfiniBand hardware.

In some embodiments, at least one of the subscribers is to remotely pull said messages using RDMA read operation through InfiniBand hardware and by bypassing an Operating System (OS) of the data publisher.

In some embodiments, at least one of the subscribers is to remotely read messages from the message stores over RDMA-capable, kernel driver-bypassing and OS-bypassing capable hardware.

In some embodiments, the data publisher includes a publisher application to receive incoming data from an external data provider, to re-format the incoming data into messages, and to write the messages into the one or more message stores.

In some embodiments, the incoming data includes stock trading information; a message store is to store data related to stock trading information associated with a first set of one or more stocks; and a second message store is to store data related to stock trading information associated with a second, different, set of one or more stocks.

In some embodiments, a common structure of the messages includes a message header and a message body; and the message header includes at least a validity parameter field, a message serial number field, and a field indicating the size of the message body.

In some embodiments, a method of publishing data to one or more subscribers includes: allocating a memory area of a local memory unit of a data publisher for storing data to be accessible for Remote Direct Memory Access (RDMA) read operations by one or more of the subscribers.

In some embodiments, the method includes: creating in the memory area one or more message stores able to store a plurality of messages corresponding to the data.

In some embodiments, creating a message store includes: creating a cyclic buffer to which the data publisher is able to locally write messages and from which the subscribers are able to read messages.

In some embodiments, the method includes: authorizing to one or more subscribers to remotely pull on demand at least some of the messages from at least one of the message stores.

In some embodiments, the method includes: authorizing to a first subscriber to pull data from a first message store; and un-authorizing to the first subscriber to pull data from a second message store.

In some embodiments, the method includes: authorizing to at least one of the subscribers to perform a Remote Direct Memory Access (RDMA) read operation on the memory area to pull at least some of the messages.

In some embodiments, the method includes: authorizing to at least one of the subscribers to read from the memory area by bypassing an Operating System (OS) of the data publisher.

In some embodiments, the method includes: authorizing to a first subscriber to remotely pull messages from the memory area at a first pace; and authorizing to a second subscriber to remotely pull messages from the memory area at a second, different, pace.

In some embodiments, the method includes: decoupling the one or more subscribers from the data publisher; and authorizing the one or more subscribers to remotely pull data from the memory area independent of a timing scheme common to the data publisher and the subscribers.

In some embodiments, the method includes: authorizing to at least one of the subscribers to perform the RDMA read operation through InfiniBand hardware.

In some embodiments, the method includes: authorizing to at least one of the subscribers to remotely read messages from the message stores over RDMA-capable, kernel driver-bypassing and OS-bypassing capable hardware.

In some embodiments, the method includes: receiving incoming data from an external data provider; re-formatting the incoming data into messages; and writing the messages into the one or more message stores.

In some embodiments, the incoming data includes stock trading information, and the writing includes: writing into a first message store data related to stock trading information associated with a first set of one or more stocks; and writing into a second message store data related to stock trading information associated with a second, different, set of one or more stocks.

In some embodiments, a common structure of the messages includes a message header and a message body; and the message header includes at least a validity parameter field, a message serial number field, and a field indicating the size of the message body.

In some embodiments, the method includes authorizing to at least one of the subscribers to remotely pull the messages using RDMA read operation through InfiniBand hardware and by bypassing an Operating System (OS) of the data publisher.

Some embodiments include, for example, a computer program product including a computer-useable medium including a computer-readable program, wherein the computer-readable program when executed on a computer causes the computer to perform methods in accordance with some embodiments of the invention.

Some embodiments of the invention may provide other and/or additional benefits and/or advantages.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. Hardware components, software components, logical components, links, and other types of components may be presented using a single or unified view; for example, a software module described herein may be implemented using one or more hardware components; and a hardware component described herein may be implemented using one or more software components. The figures are listed below.

DETAILED DESCRIPTION

Figure 1:
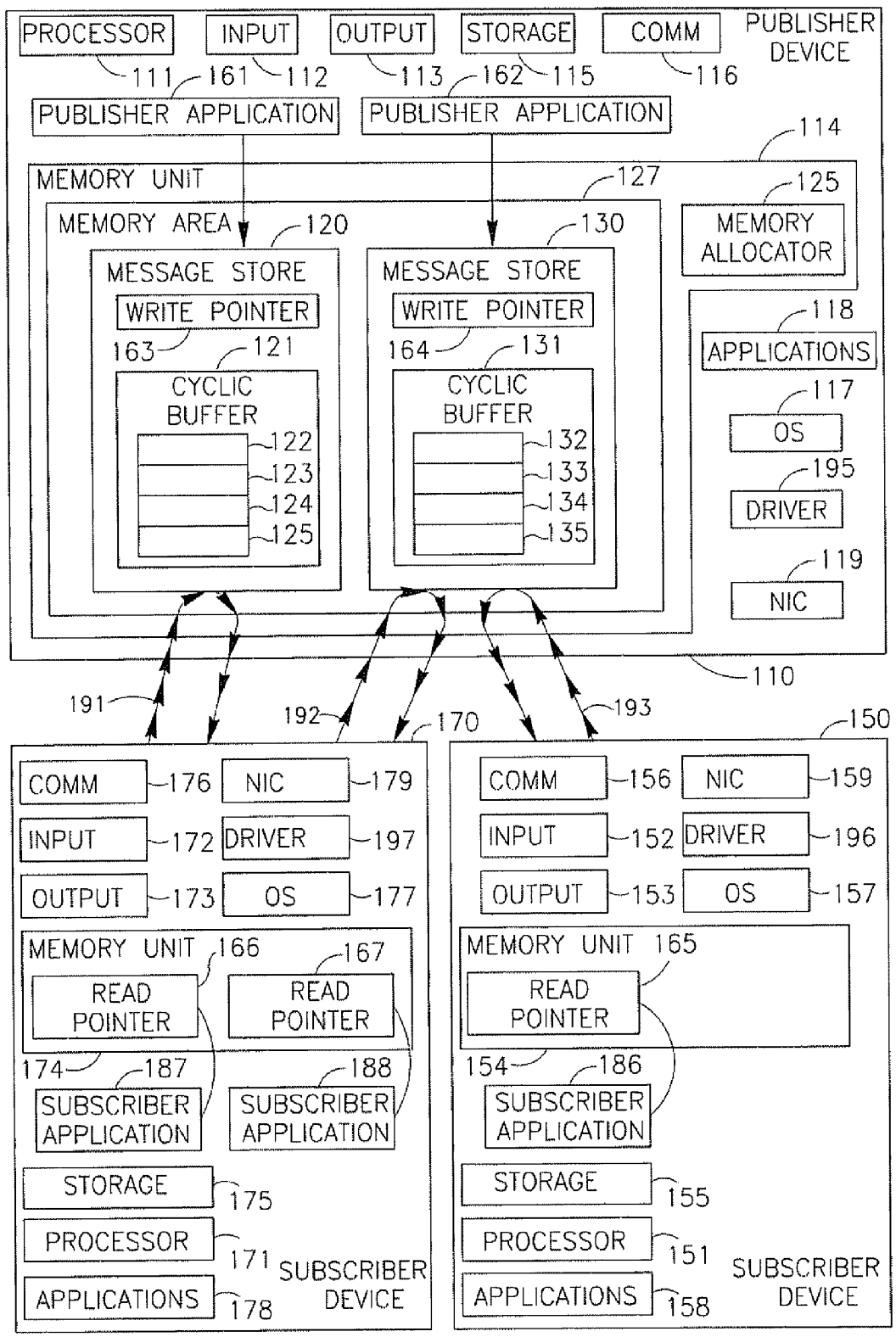
FIG. 1 is a schematic block diagram illustration of a message distribution system in accordance with a demonstrative embodiment of the invention.

In the following detailed description, numerous specific details are set forth in order to provide a thorough understanding of some embodiments of the invention. However, it will be understood by persons of ordinary skill in the art that some embodiments of the invention may be practiced without these specific details. In some instances, well-known methods, procedures, components, units and/or circuits are not described in detail so as not to obscure the discussion.

Discussions herein utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality" as used herein includes for example, "multiple" or "two or more" For example, "a plurality of items" includes two or more items.

Although portions of the discussion herein relate, for demonstrative purposes, to wired links and/or wired communications, embodiments of the invention are not limited in this regard, and may include one or more wired or wireless links, may utilize one or more components of wireless communication, may utilize one or more methods or protocols of wireless communication, or the like. Some embodiments of the invention may utilize wired communication and/or wireless communication.

The term "subscriber" as used herein includes, for example, a remote subscriber; a local subscriber, a remote client, a local client, a subscriber implemented using a Virtual Machine (VM), a subscriber implemented using hardware components and/or software components, a subscriber implemented using a client device or a client computer, or the like.

The term "publisher" as used herein includes, for example, a remote publisher, a local publisher, a remote server, a local server, a publisher implemented using a Virtual Machine (VM), a publisher implemented using hardware components and/or software components, a publisher implemented using a publisher device or a publisher computer, or the like.

The terms "Remote Direct Memory Access" and "RDMA" as used herein include, for example, hardware and/or software and/or infrastructure and/or fabric and/or links and/or adapters and/or architectures, which allow direct hardware access to write from a local memory to a remote node's memory and/or to read from a remote node's memory to a local node's memory; without involving the Operating System (OS) of the remote computer, or by bypassing the OS of the remote computer. Additionally or alternatively, RDMA may be implemented, for example, substantially without involving the OS of the initiating node, or by bypassing the OS of the initiating node; providing high-throughput, low-latency, zero-copy networking; allowing a network adapter (e.g., a Network Interface Card (11C), a Host Channel Adapter (HCA), or the like) to transfer data directly to or from application memory, eliminating the need to copy data between application memory and OS data buffers; eliminating utilization of processors, caches, and/or context switches; allowing data transfer simultaneously and in parallel with other operations; or other suitable links, components, fabrics and/or infrastructures.

In some embodiments, the RDMA read operations performed by one or more subscribers with regard to a cyclic buffer or a message store of a data publisher, may be used as an exclusive data distribution mechanism, or may be used in combination with other mechanisms for data distribution, e.g., with multicast transmissions, with multiple unicast transmissions, with a mechanism that combines data "pushing" by the data publisher and data "pulling" by one or more subscribers, or with other suitable mechanisms.

The terms "communication unit" or "Network Interface Card" or "NIC" as used herein include, for example, a Host Channel Adapter (HCA), an RDMA-capable NIC or HCA, an Ethernet NIC or HCA, a NIC or HCA or card or adaptor with TCP offload capabilities, an RDMA-capable hardware component or card or adaptor, a NIC or HCA having OS-bypass capabilities, an InfiniBand NIC or HCA or card or adaptor, an iWarp NIC or HCA or card or adaptor, a card or adaptor able to bypass OS and/or kernel and/or driver(s), a card or adaptor able to directly access a memory of a remote device, or the like.

The term "Ethernet" as used herein includes, for example, Ethernet, Ethernet in accordance with IEEE 802.3 standard and/or 802.2 standard and/or other standards, Gigabit Ethernet (GEth), 10-Gigabit Ethernet, 100-Gigabit Ethernet, Fast Ethernet, or other types of Ethernet.

The terms "Operating System (OS) bypassing" or "OS bypass" as used herein includes, for example, a substantially complete or a partial OS bypassing, a substantially complete or a partial kernel bypassing, a substantially complete or a partial bypass of a driver, or the like. In some embodiments, OS bypass may be implemented by using system calls to OS kernel in order to execute connection control and/or memory registration for RDMA, while send and/or receive operation of data are performed mostly or solely by OS bypass.

Some embodiments of the invention may be used in conjunction with various devices and systems, for example, a Personal Computer (PC), a desktop computer, a mobile computer, a laptop computer, a notebook computer, a tablet computer, a server computer, a handheld computer, a handheld device, a Personal Digital Assistant (PDA) device, a handheld PDA device, an on-board device, an off-board device, a hybrid device, a vehicular device, a non-vehicular device, a mobile or portable device, a non-mobile or non-portable device, a wireless communication station, a wireless communication device, a wireless Access Point (AP), a wired or wireless router, a wired or wireless modem, a wired or wireless network, a local Area Network (LAN), a Wireless LAN (WLAN), a Metropolitan Area Network (MAN), a Wireless MAN (WMAN), a Wide Area Network (WAN), a Wireless WAN (WWAN), a Personal Area Network (PAN), a Wireless PAN (WPAN), devices and/or networks operating in accordance with existing IEEE 802.11, 802.11a, 802.11b, 802.11e, 802.11g, 802.11h, 802.11i, 802.11n, 802.16, 802.16d, 802.16e standards and/or future versions and/or derivatives and/or Long Term Evolution (LTE) of the above standards, units and/or devices which are part of the above networks, one way and/or two-way radio communication systems, cellular radiotelephone communication systems, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, a wired or wireless handheld device (e.g., BlackBerry, Palm Treo), a Wireless Application Protocol (WAP) device, or the like.

Some embodiments of the invention may be used in conjunction with one or more types of wireless communication signals and/or systems, for example, Radio Frequency (RF), Infra Red (IR), Frequency-Division Multiplexing (FDM), Orthogonal FDM (OFDM), Time-Division Multiplexing (TDM), Time-Division Multiple Access (TDMA), Extended TDMA (E-TDMA), General Packet Radio Service (GPRS), extended GPRS, Code-Division Multiple Access (CDMA), Wideband CDMA (WCDMA), CDMA 2000, Multi-Carrier Modulation (MDM), Discrete Multi-Tone (DMT), Bluetooth®, Global Positioning System (GPS), Wi-Fi, Wi-Max, ZigBee™, Global System for Mobile communication (GSM), 2G, 2.5G, 3G, 3.5G, or the like, Embodiments of the invention may be used in various other devices, systems and/or networks.

Although some portions of the discussion herein may relate, for demonstrative purposes, to a fast or high-speed interconnect infrastructure, to a fast or high-speed interconnect component or adapter with OS bypass capabilities, to a fast or high-speed interconnect card or Network Interface Card (NIC) with OS bypass capabilities, or to a to a fast or high-speed interconnect infrastructure or fabric, embodiments of the invention are not limited in this regard, and may be used in conjunction with other infrastructures, fabrics, components, adapters, host channel adapters, cards or NICs, which may or may not necessarily be fast or high-speed or with OS bypass capabilities. For example, some embodiments of the invention may be utilized in conjunction with InfiniBand (113) infrastructures, fabrics, components, adapters, host channel adapters, cards or NICs; with iWarp infrastructures, fabrics, components, adapters, host channel adapters, cards or NICs; with Ethernet infrastructures, fabrics, components, adapters, host channel adapters, cards or NICs; with Ethernet TCP offload infrastructures, fabrics, components, adapters, host channel adapters, cards or NICs; with Ethernet (e.g., Fast Ethernet, Gigabit Ethernet (GEth), 10-Gigabit Ethernet, 100-Gigabit Ethernet, or other types of Ethernet) infrastructures, fabrics, components, adapters, host channel adapters, cards or NICs; with infrastructures, fabrics, components, adapters, host channel adapters, cards or NICs that have OS with infrastructures, fabrics, components, adapters, host channel adapters, cards or NICs that allow a user mode application to directly access such hardware and bypassing a call to the operating system (namely, with OS bypass capabilities); with infrastructures, fabrics, components, adapters, host channel adapters, cards or NICs that have OS-bypass capabilities; with infrastructures, fabrics, components, adapters, host channel adapters, cards or NICs that are connectionless and/or stateless; and/or other suitable hardware.

FIG. 1 schematically illustrates a block diagram of a message distribution system 100 in accordance with some demonstrative embodiments of the invention. System 100 includes one or more publisher applications running on one or more servers or publisher devices, for example, a publisher device 110; and one or, more subscriber applications running on one or more subscriber devices, for example, subscriber devices 150 and 170.

Although FIG. 1 shows, for demonstrative purposes, two publisher applications and three subscriber applications running on one publisher device and two subscriber devices, other number of publisher applications may be used, and other number of subscriber applications may be used; similarly, other number of publisher devices may be used, and other number of subscriber devices may be used.

Publisher device 110 includes, for example, a processor 111, an input unit 112, an output unit 113, a memory unit 114, a storage unit 115, and a communication unit 116. Server 110 may optionally include other suitable hardware components and/or software components. Publisher device 110 may be implemented, for example, using a computing platform or a server computer.

Processor 111 nay include, for example, a Central Processing Unit (CPU), a Digital Signal Processor (DSP), one or more processor cores, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multi-purpose or specific processor or controller. Processor 111 may execute instructions, for example, of an Operating System (OS) 117 of publisher device 110 or of one or more software applications 118.

Input unit 112 may include, for example, a keyboard, a keypad, a mouse, a touch-pad, a track-ball, a track-wheel, a thumb-wheel, a scroll-wheel, a stylus, one or more buttons or sliders, a microphone, or other suitable pointing device or input device Output unit 113 may include, for example, a monitor, a screen, a Cathode Ray Tube (CRT) display unit, a Liquid Crystal Display (LCD) display unit, a plasma display unit, a projector, a projection device, a television, a High Definition Television (HDTV) display unit, one or more audio speakers, or other suitable output devices.

Memory unit 114 may include, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units or storage units. Storage unit 115 may include, for example, a hard disk drive, a floppy disk drive, a Compact Disk (CD) drive, a CD-ROM drive, a Digital Versatile Disk (DVD) drive, a magnetic storage device, an optical storage device, a storage device utilizing removable storage mediums or storage articles, or other suitable removable or non-removable storage units.

Communication unit 116 may include, for example, a wired or wireless Network Interface Card (NIC), Infiniband Host Channel Adaptor (HCA), a wired or wireless modem, a wired or wireless router or switch or hub, a wired or wireless receiver and/or transmitter, a wired or wireless transmitter-receiver and/or transceiver, a Radio Frequency (RF) communication unit or transceiver, or other units able to transmit and/or receive signals, blocks, frames, transmission streams, packets, messages and/or data. Optionally, communication unit 116 may include, or may be associated with, one or, more antennas, for example, a dipole antenna, a monopole antenna, an omni-directional antenna, an end fed antenna, a circularly polarized antenna, a micro-strip antenna, a diversity antenna, or the like.

Publisher device 110 further includes a NIC 119, for example, a fast or high-speed interconnect card or adapter or Host Channel Adapter (HCA); a NIC or HCA having OS bypass and/or RDMA capabilities; an InfiniBand (IB) NIC or HCA; an Ethernet NIC or HCA; an Ethernet (e.g., Fast Ethernet, Gigabit Ethernet (GEth), 10-Gigabit Ethernet, 100-Gigabit Ethernet, or other types of Ethernet) NIC or HCA; a NIC or HCA that allows a user-mode application to directly access hardware, and/or to directly access remote hardware (e.g., using I<MA); an RDMA-capable NIC or HCA; a NIC or HCA that allows a user-mode application to bypass call(s) to a local OS and/or to an OS of a remote device; a connectionless and/or stateless NIC or HCA; and/or other suitable hardware Optionally, NIC 119 may be associated with a driver 195, for example, a software module or an interface allowing other software components of the publisher device (e.g., the OS 117 or the applications 118) to interact with the NIC 119.

In some embodiments, the components of publisher device 110 may be enclosed in a common housing, packaging, or the like, and may be interconnected or operably associated using one or more wired or wireless links. In other embodiments, components of publisher device 110 may be distributed among multiple or separate devices or locations, may be implemented using a client/server configuration, may communicate using remote access methods, or the like.

Similarly, subscriber device 150 includes, for example, a processor 151, an input unit 152, an output unit 153, a memory unit 154, a storage unit 155, a communication unit 156, an OS 157, one or more software applications 158, and a NIC 159 optionally associated with a driver 196. Similarly, subscriber device 170 includes, for example, a processor 171, an input unit 172, an output unit 173, a memory unit 174, a storage unit 175, a communication unit 176, an OS 177, one or more software applications 178, and a NIC 179 optionally associated with a driver 197

The NIC 119 of server 110 may be connected to the NIC 159 of client 150 through a link, and the NIC 119 of server 110 may be connected to the NIC 179 of client 170 through a link. These links may include, for example, a fast or high-speed interconnect link; a link able to allow OS bypassing; an InfiniBand (IB) link; an Ethernet (e.g., Fast Ethernet, Gigabit Ethernet (GEth), 10-Gigabit Ethernet, 100-Gigabit Ethernet, or other types of Ethernet) link; a link that allows a user-mode application of the client to directly access hardware, and/or to directly access remote hardware (e.g., using RDMA) of the publisher device 110; an RDMA-capable link; a link that allows a user-mode application of the client to bypass call(s) to a local OS and/or to an OS of a remote device; a link that allows connectionless and/or stateless communication; and/or other suitable wired or wireless links, fabrics, or infrastructures.

A subscriber device may include one or more subscriber applications. For example, subscriber device 150 includes a subscriber application 187; and subscriber device 170 includes subscriber applications 187 and 188. Other number of subscriber applications per subscriber device may be used.

The publisher device 110 defines that at least a portion or area of the memory unit 114 is directly accessible to the subscriber devices 150 and 170, for example, using RDMA. For example, a first portion or area of the memory unit 114 is defined as non-accessible or non-readable by the subscriber devices 150 and 170; whereas a second portion or area (e.g., a memory area 127) of the memory unit 114 is defined as directly accessible and/or directly readable by the subscriber devices 150 and 170. For example, memory area 127 of the memory unit 114 of publishers device 110 is defined or allocated as RDMA-accessible with respect to subscriber devices 150 and/or 170. The allocation may be performed, for example, by a memory allocator 125 which may be implemented as part of memory unit 114, as a software module, as a hardware component (e.g., a memory controller, a processor, or the like), or as a combination thereof. Registration of the subscriber devices 150 and 170 may be performed, for example, by the NIC 119, which may be implemented as an Infiniband HCA unit or Ethernet NIC, optionally utilizing a software module, a hardware component (e.g., a memory controller, a processor, or the like), or a combination thereof. The initialization phase may optionally include registration of subscriber devices 150 and/or 170 (e.g., as being able and authorized to remotely and directly read from the memory area 127, and particularly from message stores 120 and/or 130 included therein), and/or registration of the remote NICs 159 and/or 179 (e.g., as being able and authorized to remotely and directly read from the memory area 127). In the latter phase the subscriber devices 150 and/or 170 may receive the virtual memory addresses of the message stores 120 and/or 130 for performing the RDMA read operations. Other suitable methods may be used to allow the subscriber devices 150 and/or 170 to perform RDMA read operations from message stores 120 and/or 130, for example, mechanisms using a virtual memory address of the remote memory, mechanisms using an offset, mechanisms using a tag, or other suitable mechanisms.

One or more message stores or message banks are created and managed by the publisher device 110 in the RDMA-accessible portion of memory unit 114. For example, a message store 120 and a message store 130 may be defined, allocated, registered towards the NIC 119, or otherwise created. For example, in addition to memory allocation for the message stores 120 and 130, a registration may be performed in order to register the memory stores 120 and 130 (or the memory area 127 in which they reside) with respect to the NIC 119 (and/or with respect to other hardware components or infrastructure, edge the NIC 159 and/or the NIC 179); the registration indicates that subscriber devices 150 and/or 170 are allowed to perform RDMA read operations to pull data from message stores 120 and/or 130, which reside in the RDMA-accessible memory area 127. Message store 120 is implemented, for example, using a cyclic buffer 121 having multiple records or messages, for example, messages 122-125. Similarly, message store 130 is implemented, for example, using a cyclic buffer 131 having multiple records or messages, for example, messages 132-135. Other numbers of publishers may be used, other numbers of message stores may be used, and other numbers of messages per cyclic buffer may be used.

The publisher device 110 writes data, e.g., messages, into message store 120 and/or into message store 130, from time to time. For example, a publisher application 161 may receive data from an external data source, or may generate data, which may be written into message store 120. Similarly, a publisher application 162 may receive data from an external data source, or may generate data, which may be written into message store 130. In some embodiments, one publisher application is able to write messages only into one message store associated therewith; in other embodiments, one publisher application is able to write messages into multiple message stores associated therewith, or into substantially all the message stores. In some embodiments, publisher applications 161 or 162 may optionally include, for example, a front-end module to receive information (e.g., raw or pre-formatted) from an external source; a converter or re-formatter to re-format the information in accordance with pre-defined formatting rules; and a writing component to write messages into the cyclic buffer 121 or 131.

In some embodiments, for example, publisher application 161 receives substantially real time information related to stock exchange transactions of a first stock (e.g., recent transactions information), and writes such information as separate messages into the cyclic buffer 121 of message store 120; for example, information of one transaction of the first stock is written as one message into one record of the cyclic buffer 121 of message store 120. Similarly, publisher application 162 receives substantially real-time information related to stock exchange transactions of a second stock (e.g., recent transactions information), and writes such information as separate messages into the cyclic buffer 131 of message store 130; for example, information of one transaction of the second stock is written as one message into one record of the cyclic buffer 131 of message store 130. In some embodiments, a single process or thread may be associated with publication of data to multiple message stores or with multiple publisher applications, and may not necessarily be limited to publication of data to a single message store or from a single publisher application.

For example, publisher application 161 writes messages into the cyclic buffer 121 of message store 120. Optionally, a write pointer 163 is used to point to the next record into which writing is expected to be performed; other tracking or pointing methods may be used Optionally, a wrap-around handling mechanism may be used with respect to cyclic buffer 121.

In some embodiments, messages stored in the message stores 120 and/or 130 are not "pushed" from the publisher device 110 to subscriber devices 150 and/or 170; are not transferred and not transmitted from the publisher device 110 to subscriber devices 150 and/or 170 using multiple unicast transmissions, using multicast, using broadcast, or using other "one to many" push mechanisms. Instead, subscriber devices 150 and/or 170 "pull" messages from the message stores 120 and/or 130, at the own pace or rate of subscriber devices 150 and/or 170, upon demand of subscriber devices 150 and/or 170, or the like. Information indicating the identity of the publisher device 110 from which the subscriber devices 150 and/or 170 may pull messages (egg, including port identification), may be pre-delivered to the subscriber devices 150 and/or 170, may be pre-set or pre-defined in subscriber devices 150 and/or 170, or may be otherwise advertised or notified to subscriber devices 150 and/or 170 (e.g., using multicast, using multiple unicast transmissions, or the like).

For example, subscriber device 150 utilizes the link which connects the NIC 119 of publisher device 110 with the NIC 159 of subscriber device 150, in order to directly access the message store 130 and to directly read messages from the message store 130. This is performed, for example, using RDMA reads initiated by the subscriber device 150. Additionally or alternatively, this is per-formed while bypassing the OS 117 and the driver 195 of publisher device 110. For example, an RDMA, OS-bypassing, driver-bypassing pull 193 is performed by subscriber device 150 in order to read messages from message store 130.

Similarly, subscriber device 170 utilizes the link which connects the NIC 119 of publisher device 110 with the NIC 179 of subscriber device 170, in order to directly access the message stores 120 and 130, and to directly read messages from the message stores 120 and 130. This is performed, for example, using R'DMA reads initiated by the subscriber device 170. Additionally or alternatively, this is performed while bypassing the OS 117 and the driver 195 of publisher device 110. For example, a RDMA, OS-bypassing, driver-bypassing pull 192 is performed by subscriber device 170 in order to read messages from message store 130; and a R-DMA, OS-bypassing, driver-bypassing pull 191 is performed by subscriber device 170 in order to read messages from message store 120

In some embodiments, optionally, cyclic buffer 121 may have a first size, whereas cyclic buffer 131 may have a second, different, size. The cyclic buffer size may be set by the publisher device 110, for example, based on past utilization of the cyclic buffer, based on an analysis of past performance, based on an estimate of the expected utilization of the cyclic buffer based on specific implementation requirements, or the like. In other embodiments, cyclic buffers may have a common (e.g., constant) size. In some embodiments, cyclic buffers may dynamically modify their size (e.g., increase their size, and/or decrease their size) by optionally using a pointer to the cyclic buffer continuance. In some embodiments, the size of the cyclic buffer may optionally continue to increase, for example, to the extent required (ergo, optionally by using a pointer to the cyclic buffer continuance), thereby forming a linked list structure of cyclic buffers.

In some embodiments, one or more pointers may be used by system 100 to facilitate writing to cyclic buffers 121 and/or 131, and/or to facilitate reading from cyclic buffers 121 and/or 131. For example, in publisher device 110, cyclic buffer 121 is associated with a write pointer 163, which points to the location in cyclic buffer 121 to which the next write operation is to be performed (e.g., by publisher application 161); and cyclic buffer 131 is associated with a write pointer 164, which points to the location in cyclic buffer 131 to which the next write operation is to be performed (egg, by publisher application 162).

On the client side, for example, subscriber device 150 utilizes a read pointer 165, which points to the location in cyclic buffer 131 from which the next read operation is to be performed by subscriber application 186 of subscriber device 150; subscriber device 170 utilizes a read pointer 166, which points to the location in cyclic buffer 121 from which the next read operation (from that cyclic buffer 121) is to be performed by subscriber application 187 of subscriber device 170; and subscriber device 170 further utilizes a read pointer 167, which points to the location in cyclic buffer 131 from which the next read operation (from that cyclic buffer 131) is to be performed by subscriber application 188 of subscriber device 170A. Other types of pointers may be used, and suitable mechanisms may be used to handle the updating or advancement of pointers, wraparounds, or the like.

In some embodiments, subscriber device 150 may directly read from cyclic buffer 131 a portion ("chunk") of data, which may include one or more messages, and may not necessarily correspond to an integer number of messages. For example, subscriber device 150 may directly read from cyclic buffer 131 a portion of 4,300 bytes, which may correspond to approximately 26.34 messages, namely, to 26 complete messages and a fraction of another message. Based on the headers of messages, subscriber device 150 may determine that it read 26 messages and a fraction of another message, and may re-read the fractioned message in a subsequent read operation (e.g., in a subsequent group of multiple messages).

In some embodiments, subscriber device 150 may periodically poll the cyclic buffer 131, for example, in order to determine whether new messages were added to the cyclic buffer 131 (e.g., based on message serial numbers), and in order to read new messages that were not already read by subscriber device 150 (e.g., based on message serial numbers). In some embodiments, in addition to or instead of a polling mechanism, an alert mechanism may be used; for example, subscriber device 150 may notify the publisher device 110 that subscriber device 150 goes into a "sleep mode", a stand-by mode, a reduced-power mode, a semi-operational mode, or the like, and publisher device 110 may send to subscriber device 150 an alert message when one or more new messages are written into the cyclic buffer 131, thereby notifying the subscriber device 150 to "awake" and become fully operational for further pulling of data. In some embodiments, the alert mechanism may include, for example, a unicast transmission waking up a particular subscriber device (e.g., subscriber device 150), and/or a multicast transmission waking up multiple subscriber devices (e.g., subscriber devices 150 and/or 170).

In some embodiments, system 100 is a lightweight messaging and data publishing system which is used in conjunction with high-performance applications. System 100 utilizes RDMA capabilities (e.g., RDMA-capable fabric, RDMA-capable NICs, or the like) for efficient message transfer and data publishing. In some embodiments, system 100 is used in conjunction with "one to many" publishing, in which a server or a publisher (or a small number of servers or publishers) publishes data (e.g., a large amount of data) to a significant number of subscribers (e.g., hundreds or thousands of subscribers). In some embodiments, system 100 is used for mission-critical publishing that requires reliable delivery of data in substantially real-time. In some embodiments, for example, system 100 is used in conjunction with stock exchange data, history data of stock transactions, stock trading data, trading data of various commodities and/or financial instruments (e.g., securities, options, or the like), banking data, monetary data, money transfer data, gambling-related data, sports-related data (e.g., scores, rankings, or the like), data including a large amount of alerts or "log entries" generated by a computing system or network, or the like.

In some embodiments, in which system 100 is implemented using client/server architecture, system 100 includes a server side (publisher side) and a client side (subscriber side). The server side allows the publisher device 110 to allocate a local memory area available for RDMA read operations of clients (ergo, subscriber devices 150 and/or 170), thereby creating server-side message stores 120 and 130. The server side further allows management of the message stores 120 and 130, as well as message posting into one or more of the message stores 120 and 130 held in the local memory unit 114 of the publisher device 110. The client side of system 100 allows multiple clients (e.g., subscriber devices 150 and 170) to subscribe to one or more message stores that are stored on a server-side memory (namely, message stores 120 and/or 130 of publisher device 110), as well as to retrieve the latest updates that were written by the publisher device 110 to a specified message store.

System 100 utilizes RDMA reads initiated by the subscriber devices 150 and/or 170 for the data path; whereas non-RDMA reads are utilized for the control path (edge, using Connection Management Abstraction (CMA)). In some embodiments, system 100 provides notification to upper layers in case of connection termination; in some embodiments, recovery from connection termination (e.g., by implementing a redundant setup) is handled by the subscribers, namely by subscriber devices 150 and/or 170.

The publisher device 110 handles and manages the RDMA cyclic buffers 121 and 131 that operate as message stores. For example, the publisher device 110 defines, allocates and/or maintains the cyclic buffers 121 and 131. In some embodiments, the size of cyclic buffer 121 or 131 is based on the size requested by relevant publisher application 161 or 162 per message store. In some embodiments, the size of cyclic buffer 121 or 131 may increase, for example, upon request of the relevant publisher application 161 or 162 or upon request of one or more subscriber devices 150 or 170. The cyclic buffer 121 or 131 is registered towards the RDMA hardware, for example, the NIC 119, for RDMA read operations, such that subscriber devices 150 and/or 170 may directly read from the cyclic buffer 121 or 131. In some embodiments, each message posted onto the message store 120 or 130, is stored as a part of an internal structure that indicates a "magic number"

to show message integrity, message size, the payload, a monotonously increasing serial number, and a validity parameter. Other suitable parameters or fields may be used in the message store, and other ordering of fields or parameters may be used.

In some embodiments, message proper structure is verified using message "magic number". Validity of records or messages that are read by the subscriber device 150 or 170 is guaranteed, for example, by atomically setting the validity parameter. In some embodiments, upon a wraparound of the cyclic buffer 121 or 131 (for example, where the publisher application's 161 or 162 write pointer 163 or 164 passes the subscriber application's 186, 187 or 187 read pointer 166, 167 or 165), the subscriber application 186, 187 or 188 may utilize the message's magic number to validate message integrity, and/or may utilize the message's serial number to detect loss of synchronization with the publisher device 110, and/or to detect possible loss of messages, and/or to determine the number of messages lost. Other methods may be used to detect and/or handle (e.g., re-read) lost messages. In some embodiments, if message integrity is lost, the subscriber device 170 or 150 may reset its read pointer 166, 167 or 165 to the beginning of cyclic buffer 121 or 131, and then read the message serial number to detect loss of synchronization with the publisher device 110, to detect possible loss of messages, and/or to determine the number of messages lost Optionally, upon detection of message(s) loss, the subscriber application 186, 187 or 188 may utilize other suitable synchronization mechanism to synchronize with the relevant publisher application 161 or 162.

The subscriber devices 150 and/or 170 may directly read, at their own pace, from the cyclic buffers 121 and/or 131 of the message stores 120 and/or 130, for example, by issuing a RDMA read operation having configurable size. The subscriber devices 150 or 170 may then parse the message(s) that were read; for example, the subscriber devices 150 or 170 may read the header of a message, which is guaranteed to exist at the beginning of the message. The subscriber devices 150 or 170 may analyze the content of one or more pre-defined message header fields, for example, the magic field (edge, storing a pre-defined sequence of bits indicating a beginning of a header of a message), a validity parameter field, a serial number field, and a message size field. Subsequent read operations by subscriber devices 150 or 170 are performed by continued traversing of the read buffer, for example, based on the value of the size field and searching for subsequent records or messages. If a new valid record does not exist, then the client-side read pointer will be set to point to the end of the last valid record in the cyclic buffer 121 or 131. Accordingly, the next RDMA read request continues from the end of the last valid message detected in the remote cyclic buffer 121 or 131.

In some embodiments, system 100 is used in conjunction with a single producer or publisher of information (e.g., publisher device 110) and multiple subscribers or consumers of information (e.g., subscriber devices 150 and 170). Multiple RDMA read operations associated with multiple clients, may coalesce to allow rapid performance of system 100 and a smaller overhead for publisher device 110.

In some embodiments, variable message size may be used, such that a first message may have a first size, and a second message may have a second, different, size. In other embodiments, a constant or substantially constant message size may be used; for example, messages may be pre-formatted to accommodate a pre-defined message size, optionally appending null values to the message if the message size is smaller than the constant message size.

In some embodiments, publisher device 110 may be adapted to perform the following operations: to establish a RDMA channel; to allow a single source (e.g., publisher application 161) to publish data on a shared memory cyclic buffer (e.g., cyclic buffer 121 of message store 120). In some embodiments, a sink (e.g., subscriber device 150 or 170) initiates a direct connection (e.g., the sink having information of the host from which the sink is requesting to read, and the port number); in response, a memory space is returned from the publisher device 110 to the subscriber device 150 or 170. In some embodiments, publisher device 110 may respond to subscriber device 150 or 170 utilizing suitable connection semantics, for example, included remote memory virtual address and remote key, such that the subscriber device 150 will be able to directly read from the cyclic buffer 121.

In some embodiments, publisher application 161 or 162 publishes a message to message store 120 or 130, where the message is written into cyclic buffer 121 or 131, and a validity bit (or parameter or flag) is set (e.g., the last bit) for proper message completeness indication to subscriber devices 170 or 150.

In some embodiments, subscriber device 150 or 170 may have pre-defined information indicating the host (e.g., the identity of publisher device 110, including a port) from which the subscriber device 150 or 170 may directly read data. Optionally, some embodiments may utilize suitable methods for advertising, discovery and/or notification of such data for utilization by subscriber device 150 and/or 170. Optionally, a multicast offload library may be used.

Some embodiments may utilize the following functions: connection establishment process and channel formation for RDMA read operation access type; and exposing of a shared buffer object having remote read operations and local write operations.

In some embodiments, publisher device 110 may have writing privileges and reading privileges with respect to cyclic buffer 121; whereas subscriber device 150 and/or 170 may have only reading privileges with respect to cyclic buffer 121.

In some embodiments, different subscribers (e.g., clients) may have different reading privileges with respect to different message stores or with respect to different cyclic buffers. For example, subscriber device 170 may be authorized to directly read messages from both message stores 120 and 130, e.g., based on a first subscription scope associated with subscriber device 170; whereas subscriber device 150 may be authorized to directly read messages only from message store 130, e.g., based on a second, smaller, subscription scope associated with subscriber device 150

Some embodiments may optionally utilize message passing libraries, for example: a module or library for assignment and/or management of the shared cyclic buffer 121 and/or 131; a module or library for management of messages; a server-side or publisher-side module or library that receives an array of arbitrary size, creates a packetized version of the array, creates and adds a header that describes the data, and writes the message into the cyclic buffer; a client-side or subscriber-side module or library that detects new messages, reads the next message, determines when messages are complete, and/or present messages for reading or printing or further processing on the client side; a payload module or library, in accordance with a self-describing message protocol, optionally using a data dictionary; a module or library to handle byte ordering; an advertising and notification module, able to send out notifications or adverts to clients, to facilitate the discovery of remote server-side or publisher-side cyclic buffers which may be directly read by clients (optionally utilizing multicast, and/or a multicast offload library).

In some embodiments, instead of utilizing a message-oriented "middleware" or "appliance" to distribute messages to thousands of subscribers, a "data fabric" architecture of server-side or publisher-side buffers may provide message stores from which thousands of subscribers may read at their own pace and rate, substantially in parallel and at high speed and high throughput. In some embodiments, for example, more than one million messages per second may be read by multiple clients from a single-CPU 64-bit server and utilizing an Infiniband stack. Some embodiments may thus reduce latency, reduce latency volatility, reduce server-side or publisher-side processing and CPU overhead, increase throughput, and increase reliability of message delivery. The publisher is not a bottleneck in the system, does not need to "push" or otherwise actively deliver data to thousands of clients or subscribers, and instead the publisher (erg, publisher device 110) writes data to its local memory unit 114. In some embodiments, instead of "pushing" data at limited-size packets (e.g., 1,518 bytes per TCP/IP packet size), multiple-kilobytes cyclic buffers may be used to allow on-demand "pulling" of data by clients or subscribers.

In some embodiments, system 100 may not include and may not utilize a timing scheme, a synchronization scheme, a pace scheme, a pre-defined pace (e.g., dictated by the publisher device 110), or other coupling scheme in order to synchronize between the publisher device 110 and one or more subscriber devices 150 and/or 170. Some embodiments thus allow substantially full de-coupling, partial de-coupling, or only loose coupling, between the publisher device 110 and the subscriber devices 150 and/or 170. Some embodiments may not include and may not utilize a runtime control channel (e.g., that ensures reliability of data delivery), a reliability management scheme, an application-level Negative Acknowledgment (NACK) mechanism, or the like.

In some embodiments, the OS 117 (or portions thereof) is utilized in some functions or in some phases of operation, for example, during an initialization phase, for privileged operations or control operations; whereas the OS 117 (or portions thereof) is bypassed for other functions or in other phases of operation, for example, in the pulling of messages using RDMA.

In some embodiments, one or more components of system 100 may be used as a proxy device, for example, in order to re-distribute or re-publish messages and to achieve or increase "fan-out" For example, subscriber device 170 and publisher device 110 may be used as a proxy device; subscriber device 170 reads messages from message stores 120 and 130; subscriber device 170 further publishes the read messages (e.g., operates as both a subscriber device and a publisher device) to one or more other subscriber devices; such other subscriber devices may perform pull operations (ego, RDMA and/or OS-bypassing read operations) in order to read messages re-published by the subscriber device (which operates as a proxy), in addition to or instead of performing pull operations from the publisher device 110. Optionally, such proxy devices may allow pull operations (e.g., RDMA and/or OS-bypassing read operations) and/or "legacy" distribution of messages (e.g., using multicast or multiple unicasts). Other architectures may be used to utilize component(s) of system 100 as proxy devices.

In some embodiments, the publisher device 110 and one or more of the subscriber devices 150 and/or 170 may be used, for example, as part of a multi-tier publishing system or a multi-tier messaging system, e.g., as a publisher of a multi-tier publishing system or a multi-tier messaging system. The tier that includes the publisher device 110 and one or more of the subscriber devices 150 and/or 170 may use, for example, substantially exclusively RDMA read operations for pulling data or messages, or a combination of RDMA read operations with "legacy" push operations (e.g., multicast, multiple unicasts, or the like). Other suitable architectures may be used.

Figure 2:
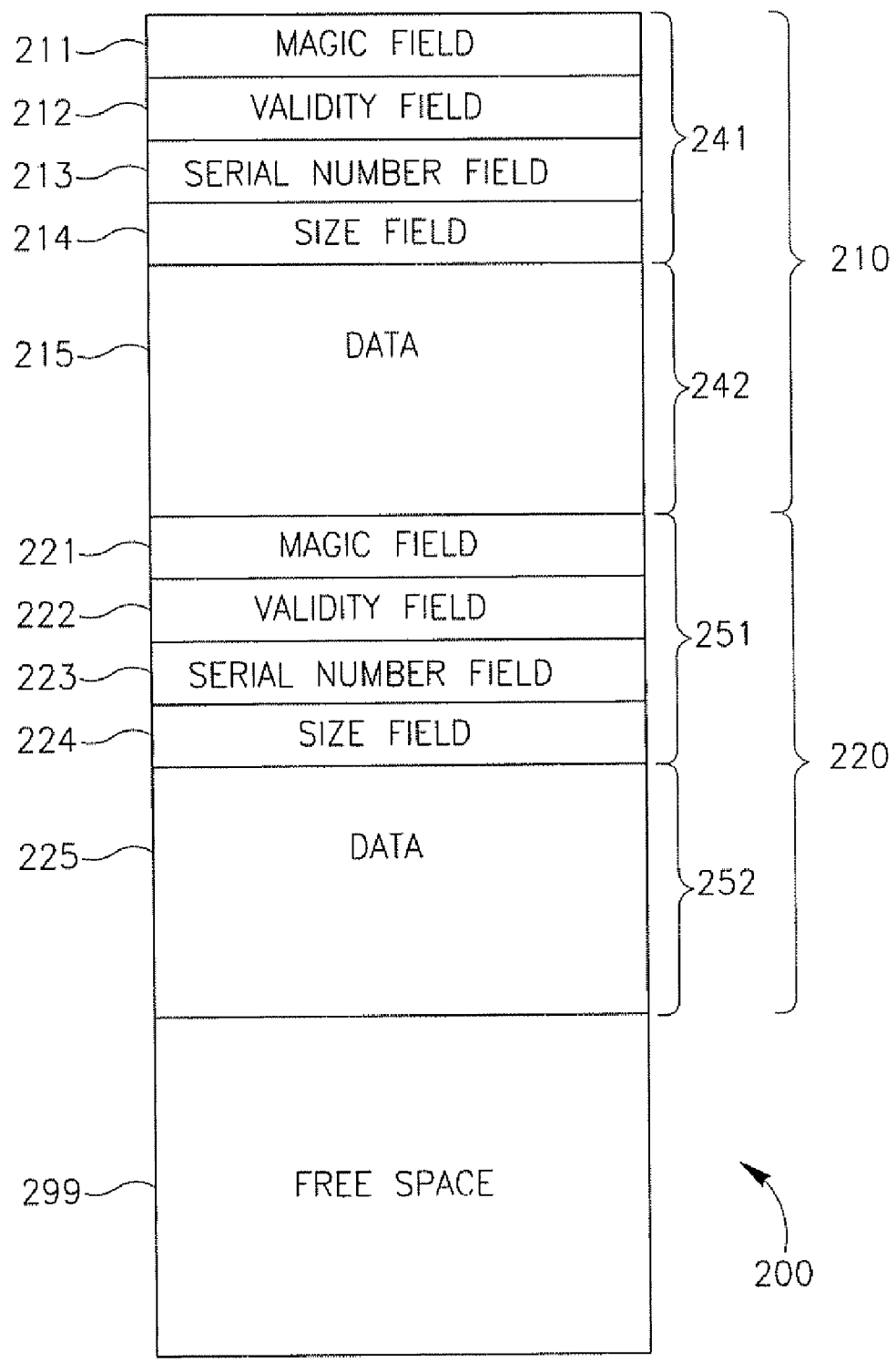
FIG. 2 is a schematic block diagram illustration of a cyclic buffer of a message store in accordance with a demonstrative embodiment of the invention.

FIG. 2 is a schematic block diagram illustration of a cyclic buffer 200 of a message store in accordance with some demonstrative embodiments of the invention. Buffer 200 includes multiple records or messages (for example, a first message 210, a second message 220, etch) and optionally includes free space 299 (e.g., to be occupied by subsequent messages).

The first message 210 includes a message header 241 followed by a message body 242. The message header 241 includes one or more fields or parameters, for example, a magic field 211, a validity field 212, a serial number field 213, and a message size field 214. The message body 242 includes substantive message data 215.

Similarly, the second message 220 includes a message header 251 followed by a message body 252. The message header 251 includes one or more fields or parameters, for example, a magic field 221, a validity field 222, a serial number field 223, and a message size field 224. The message body 252 includes substantive message data 225.

Other suitable message structures or formats may be used, other suitable fields or parameters may be used, and other structures of cyclic buffers may be used.

Figure 3:
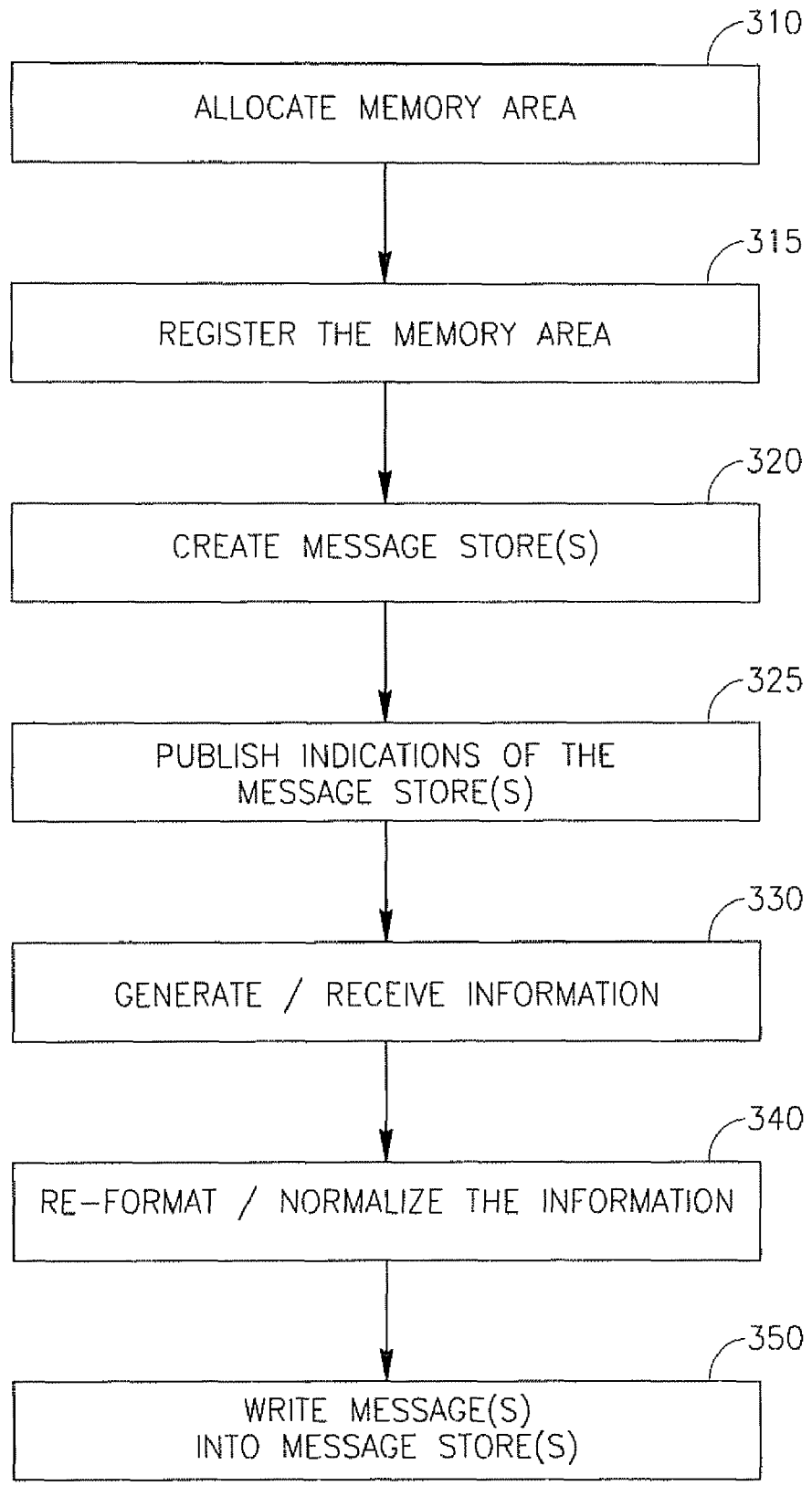
FIG. 3 is a schematic flow-chart of a method of publishing information to multiple subscribers in accordance with a demonstrative embodiment of the invention.

FIG. 3 is a schematic flow-chart of a method of publishing information to multiple subscribers (e.g., clients) in accordance with some demonstrative embodiments of the invention. Operations of the method may be used, for example, by system 100 of FIG. 1, by publisher device 110 of FIG. 1, and/or by other suitable units, devices and/or systems.

In some embodiments, the method may include, for example, allocating a memory area of a local memory unit of the publisher device as shared and accessible for direct, on-demand, "pull"-type read operations by clients or subscribers (block 310).

In some embodiments, the method may include, for example, registering the memory area for RDMA read access by subscriber device(s) (block 315).

In some embodiments, the method may include, for example, creating message stores in the memory area corresponding to different types of messages (block 320). For example, in some embodiments, each message store may correspond to a particular stock, and messages in that message store may correspond to trading information of that particular stock.

In some embodiments, the method may include, for example, publishing to one or more subscribers information indicating the presence and the identity of available message stores (block 325).

In some embodiments, the method nay include, for example, generating or receiving information intended to be published to the multiple subscribers (block 330).

In some embodiments, the method may include, optionally, re-formatting or normalizing the information (block 340); this may include, for example, conversion operations, as well as generating discrete or distinct messages to be written into message stores, in accordance with pre-defined formatting rules or message normalization rules.

In some embodiments, the method may include, for example, writing a message into one or more message stores with whom the message is associated (block 350). This may include, for example, writing into a cyclic buffer of the message store, and advancing or otherwise updating a write pointer of the cyclic buffer.

In some embodiments, the operations of blocks 310 to 325 may correspond to an initialization of the publisher; whereas the operations of blocks 330 to 350 may correspond to the ongoing publishing of messages by the publisher.

Other suitable operations or sets of operations may be used in accordance with embodiments of the invention.

Figure 4:
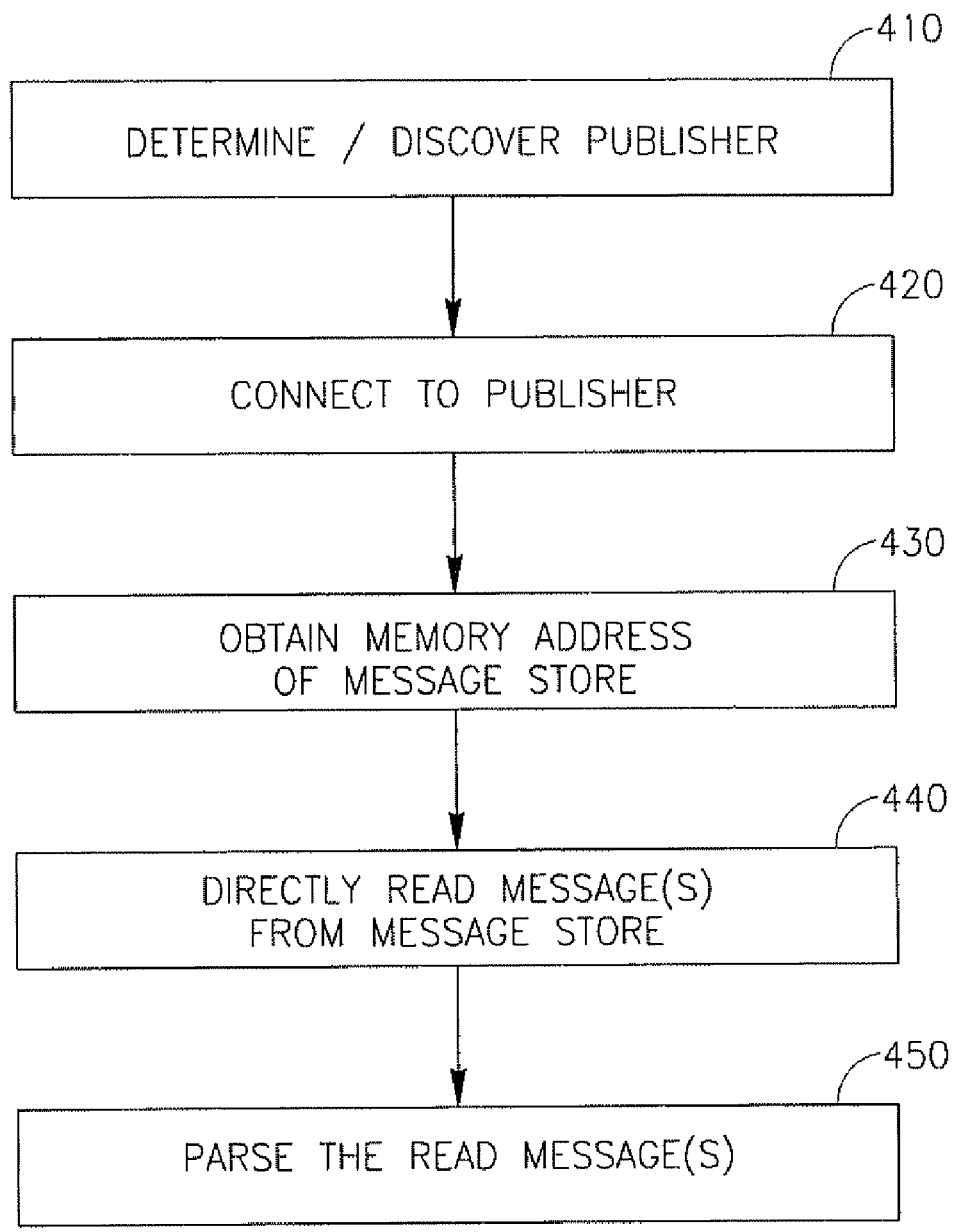
FIG. 4 is a schematic flow-chart of a method of pulling information by one or more subscribers in accordance with a demonstrative embodiment of the invention.

FIG. 4 is a schematic flow-chart of a method of pulling information by one or more subscribers (e.g., clients) in accordance with some demonstrative embodiments of the invention. Operations of the method may be used, for example, by system 100 of FIG. 1, by subscriber device 150 or 170 of FIG. 1, and/or by other suitable units, devices and/or systems.

In some embodiments, the method may include, for example, determining or discovering a publisher for a requested message store (block 410).

In some embodiments, the method may include, for example, connecting to the publisher (block 420) and obtaining the memory address and store size of the requested message store (block 430).

In some embodiments, the method may include, for example, directly reading one or more messages from one or more message stores (block 440). This may be performed by one or more subscriber devices, using OS-bypassing, using driver bypassing, using RDMA read operations, over a high-throughput low-latency fabric or infrastructure (e.g., Infini-Band), or the like.

In some embodiments, the method may include, for example, parsing the message(s) that were read by the subscriber device (block 450). For example, the subscriber device may analyze the read data, may identify message headers and message bodies, may identify discrete messages, may analyze values of parameters of the message headers, may advance or otherwise update a read pointer of the cyclic buffer, or the like.

Other suitable operations or sets of operations may be used in accordance with embodiments of the invention.

In some embodiments, the operations of blocks 410 to 430 may correspond to an initialization of the subscriber; whereas the operations of blocks 440 to 450 may correspond to the ongoing reading of messages by the subscriber.

Some embodiments of the invention, for example, may take the form of an entirely hardware embodiment, an entirely software embodiment, or an embodiment including both hardware and software elements. Some embodiments may be implemented in software, which includes but is not limited to firmware, resident software, microcode, or the like.

Furthermore, some embodiments of the invention may take the form of a computer program product accessible from a computer-usable or computer-readable medium providing program code for use by or in connection with a computer or any instruction execution system. For example, a computer-usable or computer-readable medium may be or may include any apparatus that can contain, store, communicate, propagate, or transport the program for use by or in connection with the instruction execution system, apparatus, or device.

In some embodiments, the medium may be an electronic, magnetic, optical, electromagnetic, infrared, or semiconductor system (or apparatus or device) or a propagation medium. Some demonstrative examples of a computer-readable medium may include a semiconductor or solid state memory, magnetic tape, a removable computer diskette, a random access memory (RAM), a read-only memory (ROM), a rigid magnetic disk, and an optical disk. Some demonstrative examples of optical disks include compact disk—read only memory (CD-ROM), compact disk—read/write (CD-R/W), and DVD.

In some embodiments, a data processing system suitable for storing and/or executing program code may include at least one processor coupled directly or indirectly to memory elements, for example, through a system bus. The memory elements may include, for example, local memory employed during actual execution of the program code, bulk storage, and cache memories which may provide temporary storage of at least some program code in order to reduce the number of times code must be retrieved from bulk storage during execution.

In some embodiments, input/output or I/O devices (including but not limited to keyboards, displays, pointing devices, etc.) may be coupled to the system either directly or through intervening I/O controllers. In some embodiments, network adapters may be coupled to the system to enable the data processing system to become coupled to other data processing systems or remote printers or storage devices, for example, through intervening private or public networks. In some embodiments, modems, cable modems and Ethernet cards are demonstrative examples of types of network adapters. Other suitable components may be used.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

What is claimed is:

1. A Remote Direct Memory Access (RDMA) data publisher capable of communication with one or more RDMA subscribers, the data RDMA publisher comprising:

a memory allocator to allocate a memory area of a local memory unit of the RDMA data publisher for storing data to be accessible for RDMA read operations by one or more of said RDMA subscribers, wherein the memory area comprises one or more message stores able to store a plurality of messages corresponding to said data, wherein each message store is capable of serving a plurality of subscribers simultaneously, wherein each message store comprises a cyclic buffer of messages, wherein the RDMA data publisher is to write messages into the cyclic buffer utilizing a structure which enables each RDMA subscriber (a) to autonomously detect loss of messages, and (b) to autonomously re-read lost messages via RDMA, wherein the RDMA data publisher is to write messages into the cyclic buffer independently from operations of the RDMA subscribers and independently from a subscriber request to perform RDMA read of one or more particular messages from the message store, wherein a first RDMA subscriber is authorized by the RDMA data publisher to remotely pull data using RDMA from a first message store and is not authorized by the data publisher to remotely pull data using RDMA from a second message store, wherein the first RDMA subscriber and a second RDMA subscriber are authorized by the RDMA data publisher to concurrently pull data from the first message store, wherein the first RDMA subscriber is to remotely pull messages from the first message store at a first pace using RDMA read operations, and wherein the second RDMA subscriber is to concurrently remotely pull the same messages from the first message store at a second, different, pace using RDMA read operations.

2. The RDMA data publisher of claim 1, wherein the memory area is registered towards an RDMA-capable hardware component for RDMA read operations.

3. The RDMA data publisher of claim 1, wherein the RDMA data publisher is to locally write messages to said cyclic buffer to publish a message to the plurality of subscribers without requiring network transaction following a prior connection establishment, and wherein the one or more RDMA subscribers are to remotely read messages from said cyclic buffer using RDMA.

4. The RDMA data publisher of claim 1, wherein the one or more RDMA subscribers are to remotely pull on demand at least some of said messages from at least one of the message stores.

5. The RDMA data publisher of claim 1, wherein at least one of the RDMA subscribers is to read from said memory area by bypassing an Operating System (OS) of the RDMA data publisher.

6. The RDMA data publisher of claim 1, wherein the one or more RDMA subscribers are decoupled from the RDMA data publisher,
wherein the one or more RDMA subscribers are to remotely pull data from said memory area independent of a timing scheme common to the RDMA data publisher and the one or more RDMA subscribers,
wherein the first RDMA subscriber is able to initiate an RDMA message pull operation without any prior request to the RDMA data publisher,
wherein the first RDMA subscriber is able to independently access and read messages from the first message store comprising said cyclic buffer of messages until the first RDMA subscriber encounters a message which the first RDMA subscriber determines, based on the message header, to be invalid; and, based on encountering the invalid message, the first RDMA subscriber is to determine that the first RDMA subscriber has read all valid and existing messages in the first message store and that the first RDMA subscriber is up-to-date and is synchronized with the RDMA data publisher.

7. The RDMA data publisher of claim 1, wherein at least one of the RDMA subscribers is to perform the RDMA read operation through InfiniBand hardware.

8. The RDMA data publisher of claim 4, wherein at least one of the RDMA subscribers is to remotely pull said messages using RDMA read operation through InfiniBand hardware and by bypassing an Operating System (OS) of the RDMA data publisher.

9. The RDMA data publisher of claim 1, wherein at least one of the RDMA subscribers is to remotely read messages from the message stores over RDMA-capable, kernel driver-bypassing and OS-bypassing capable hardware.

10. The RDMA data publisher of claim 1, wherein the RDMA data publisher comprises:
a publisher application to receive incoming data from an external data provider, to re-format the incoming data into messages, and to write locally the messages into the one or more message stores independently of the operation of the RDMA subscribers,
wherein the publisher application utilizes a write pointer,
wherein the publisher application writes a message to the memory area which the write pointer points to, and then the publisher application advances the write pointer to the following empty space in the same message store,
wherein the write pointer of the publisher application of the RDMA data publisher is completely decoupled from read pointers of the RDMA subscribers,
wherein each message comprises a header which defines whether or not the message is intact.

11. The RDMA data publisher of claim 10, wherein the incoming data comprises stock trading information,
wherein the first message store is to store data related to stock trading information associated with a first set of one or more stocks, and
wherein the second message store is to store data related to stock trading information associated with a second, different, set of one or more stocks.

12. The RDMA data publisher of claim 1, wherein a common structure of said messages comprises a message header and a message body, and wherein the message header comprises a validity parameter field, a message serial number field, and a field indicating the size of the message body.

13. A method of publishing data to one or more Remote Direct Memory Access (RDMA) subscribers, the method comprises:
allocating a memory area of a local memory unit of a RDMA data publisher for storing data to be accessible for RDMA read operations by one or more of said subscribers,
wherein allocating the memory area comprises creating one or more message stores able to store a plurality of messages corresponding to said data,
wherein each message store is capable of serving a plurality of subscribers simultaneously,
wherein each message store comprises a cyclic buffer of messages;
writing messages into the cyclic buffer utilizing a structure which enables each RDMA subscriber (a) to autonomously detect loss of messages, and (b) to autonomously re-read lost messages via RDMA;
writing messages into the cyclic buffer independently from operations of the RDMA subscribers and independently from a subscriber request to perform RDMA read of one or more particular messages from the message store;
authorizing a first RDMA subscriber to remotely pull data using RDMA from a first message store and un-authorizing the first RDMA subscriber to remotely pull data using RDMA from a second message store;
authorizing the first RDMA subscriber and a second RDMA subscriber to concurrently pull data from the first message store;
authorizing the first RDMA subscriber to remotely pull messages from the first message store at a first pace using RDMA read operations, and authorizing the second RDMA subscriber to concurrently remotely pull the same messages from the first message store at a second, different, pace using RDMA read operations.

14. The method of claim 13, wherein creating a message store comprises creating a cyclic buffer to which the RDMA data publisher is able to locally write messages to publish messages to the plurality of subscribers without requiring network transaction following a prior connection establishment, and from which message store the RDMA subscribers are able to read messages.

15. The method of claim 13, comprising:
authorizing to one or more RDMA subscribers to remotely pull on demand at least some of said messages from at least one of the message stores.

16. The method of claim 13, comprising:
authorizing to at least one of the RDMA subscribers to read from said memory area by bypassing an Operating System (OS) of the data publisher.

17. The method of claim 13, comprising:
decoupling the one or more RDMA subscribers from the RDMA data publisher; and
authorizing the one or more RDMA subscribers to remotely pull data from said memory area independent of a timing scheme common to the RDMA data publisher and the RDMA subscribers,
wherein the authorizing comprises authorizing the first RDMA subscriber: (a) to initiate an RDMA message pull operation without any prior request to the RDMA data publisher; (b) to independently access and read messages from the first message store comprising said cyclic buffer of messages until the first RDMA subscriber encounters a message which the first RDMA subscriber determines, based on the message header, to be invalid; and, based on encountering the invalid message, the first RDMA subscriber is to determine that the first RDMA subscriber has read all valid and existing messages in the first message store and that the first RDMA subscriber is up-to-date and is synchronized with the RDMA data publisher.

18. The method of claim 13, comprising:
authorizing to at least one of the RDMA subscribers to perform the RDMA read operation through InfiniBand hardware.

19. The method of claim 13, comprising:
authorizing to at least one of the RDMA subscribers to remotely read messages from the message stores over RDMA-capable, kernel driver-bypassing and OS-bypassing capable hardware.

20. The method of claim 13, comprising:
receiving incoming data from an external data provider;
re-formatting the incoming data into messages; and
writing locally the messages into the one or more message stores independently of the operation of the RDMA subscribers,
wherein the writing utilizes a write pointer of the RDMA data publisher,
wherein the write pointer of the RDMA data publisher is completely decoupled from read pointers of the RDMA subscribers,
wherein the writing comprises:
writing a message to the memory area which the write pointer points to, and then advancing the write pointer to the following empty space in the same message store,
wherein each message comprises a header which defines whether or not the message is intact.

21. The method of claim 20, wherein the incoming data comprises stock trading information, and wherein writing comprises:
writing into a first message store data related to stock trading information associated with a first set of one or more stocks; and
writing into a second message store data related to stock trading information associated with a second, different, set of one or more stocks.

22. The method of claim 13, wherein a common structure of said messages comprises a message header and a message body, and wherein the message header comprises a validity parameter field, a message serial number field, and a field indicating the size of the message body.

23. The method of claim 15, comprising:
authorizing to at least one of the RDMA subscribers to remotely pull said messages using RDMA read operation through InfiniBand hardware and by bypassing an Operating System (OS) of the RDMA data publisher.

* * * * *